United States Patent
Zhu et al.

(10) Patent No.: US 11,165,761 B2
(45) Date of Patent: Nov. 2, 2021

(54) METHODS, DEVICES, AND COMPUTER PROGRAM PRODUCTS FOR SERVICE SECURITY PROTECTION

(71) Applicant: EMC IP Holding Company LLC, Hopkinton, MA (US)

(72) Inventors: Xiaoliang Zhu, Shanghai (CN); Ming Zhang, Shanghai (CN); Jing Yu, Shanghai (CN); Jingjing Guo, Shanghai (CN); Yongsheng Guo, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 367 days.

(21) Appl. No.: 16/399,447

(22) Filed: Apr. 30, 2019

(65) Prior Publication Data

US 2020/0236096 A1    Jul. 23, 2020

(30) Foreign Application Priority Data

Jan. 18, 2019  (CN) .......................... 201910049709.3

(51) Int. Cl.
*H04L 29/06*    (2006.01)
*H04L 29/08*    (2006.01)

(52) U.S. Cl.
CPC .............. *H04L 63/08* (2013.01); *H04L 63/20* (2013.01); *H04L 67/10* (2013.01); *H04L 67/32* (2013.01)

(58) Field of Classification Search
CPC ......... H04L 63/08; H04L 63/20; H04L 67/10; H04L 67/32
See application file for complete search history.

(56) References Cited

U.S. PATENT DOCUMENTS

| 10,171,463 | B1* | 1/2019 | Wiger ..................... H04L 63/08 |
| 2008/0022379 | A1* | 1/2008 | Wray ..................... G06F 21/604 726/6 |
| 2009/0320107 | A1* | 12/2009 | Corella .................. G06F 21/31 726/6 |
| 2015/0135257 | A1* | 5/2015 | Shah ..................... G06F 21/6218 726/1 |
| 2018/0026985 | A1* | 1/2018 | Pogrebinsky ....... H04L 63/1425 726/7 |
| 2019/0222988 | A1* | 7/2019 | Maes .................. H04L 61/1511 |

FOREIGN PATENT DOCUMENTS

CN           104022875 A   *  9/2014   ............. G06F 21/31

* cited by examiner

*Primary Examiner* — Arvin Eskandarnia
(74) *Attorney, Agent, or Firm* — Chamberlain, Hrdlicka, White, Williams & Aughtry (57) ABSTRACT

Embodiments of the present disclosure provide a method, a device and a computer program product for protecting service security. The method of protecting service security comprises receiving, from a client, a deployment request to deploy a service into a cloud environment, and in response to the deployment request, deploying a service instance corresponding to the service in the cloud environment. The method further comprises setting, based on information specific to the service instance, an initial credential for accessing the service instance, and providing information associated with the initial credential to the client so as to enable the client to derive the initial credential.

19 Claims, 5 Drawing Sheets

METHODS, DEVICES, AND COMPUTER PROGRAM PRODUCTS FOR SERVICE SECURITY PROTECTION

CROSS-REFERENCE TO RELATED APPLICATIONS

This application claims priority to Chinese Patent Application No. 201910049709.3 filed on Jan. 20, 2019. Chinese Patent Application No. 201910049709.3 is hereby incorporated by reference in its entirety.

FIELD

The present disclosure generally relates to computer technologies, and more specifically to a method, a device, and a computer program product for protecting service security.

BACKGROUND

A cloud environment has become a popular deployment model for new systems. The term "cloud" refers to an integrated computing platform implementing a cloud computing model, which enables a shared pool of computing resources to be accessed and used conveniently in an on-demand and an easily expandable way. The shared pool includes services of a network, a virtual computing environment, a server, storage, software and the like. The computing resources can be supplied and released quickly without excessive consumption of management or participation of service providers. At present, service providers provide cloud services into the cloud network, such as access to a remote storage space, applications hosted by a cloud platform, and the like. Users can deploy and use particular services on-demand in the cloud environment by, for example, paying fees.

Security protection is considered as one of the most challenging tasks when providing cloud-based services.

SUMMARY

Embodiments of the present disclosure provide an improved solution for protecting service security.

In a first aspect of the present disclosure, there is provided a method of protecting service security. The method comprises: receiving, from a client, a deployment request to deploy a service to a cloud environment; in response to the deployment request, deploying a service instance corresponding to the service in the cloud environment; setting, based on information specific to the service instance, an initial credential for accessing the service instance; and providing related information of the initial credential to the client so as to enable the client to derive the initial credential.

In a second aspect of the present disclosure, there is provided a method of protecting service security. The method comprises: initiating a deployment request to deploy a service into a cloud environment; receiving related information of an initial credential of a service instance corresponding to the service, the service instance having been deployed in the cloud environment, and the initial credential being set based on the information specific to the service instance; and deriving from the related information the initial credential for accessing the service instance.

In a third aspect of the present disclosure, there is provided an electronic device. The electronic device comprises: a processor; and a memory coupled to the processor, and having instructions stored therein, the instructions, when executed by the processor, causing the device to perform acts comprising: receiving, from a client, a deployment request to deploy a service into a cloud environment; in response to the deployment request, deploying a service instance corresponding to the service in the cloud environment; setting, based on information specific to the service instance, an initial credential for accessing the service instance; and providing related information of the initial credential to the client so as to enable the client to derive the initial credential.

In a fourth aspect of the present disclosure, there is provided an electronic device. The electronic device comprises: a processor; and a memory coupled to the processor, and having instructions stored therein, the instructions, when executed by the processor, causing the device to perform acts comprising: initiating a deployment request to deploy a service into a cloud environment; receiving related information of an initial credential of a service instance corresponding to the service, the service instance having been deployed in the cloud environment, and the initial credential being set based on the information specific to the service instance; and deriving from the related information the initial credential for accessing the service instance.

In a fifth aspect of the present disclosure, there is provided a computer program product being tangibly stored on a computer readable medium and comprising computer executable instructions which, when executed, cause a device to perform the method of the first aspect.

In a sixth aspect of the present disclosure, there is provided a computer program product being tangibly stored on a computer readable medium and comprising computer executable instructions which, when executed, causing a device to perform the method of the second aspect.

The Summary is to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

The above and other objectives, advantages, and features of the present disclosure will become apparent through the detailed description of example embodiments of the present disclosure with reference to the accompanying drawings where the same reference symbols generally refer to the same elements in the example embodiments of the present disclosure.

DETAILED DESCRIPTION OF EMBODIMENTS

Principles of the present disclosure will now be described with reference to several example embodiments illustrated in the drawings. Although preferred embodiments of the present disclosure are shown in the drawings, it would be appreciated that description of those embodiments is merely for the purpose of enabling those skilled in the art to better understand and further implement the present disclosure and is not intended for limiting the scope disclosed herein in any manner.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The term "one example embodiment" and "an embodiment" are to be read as "at least one example embodiment." The term "another embodiment" is to be read as "at least one further embodiment." The term "first," "second" or the like can represent different or the same objects. Other definitions, either explicit or implicit, may be included below.

In the context of the present disclosure, a "cloud" or "cloud environment" refers to an integrated computing platform implementing a cloud computing model, which enables access and utilization of a shared pool of computing resources in an on-demand manner. The cloud environment is sometimes referred to as a cloud platform or cloud-based system. The cloud environment may include a private cloud based on a private or local network, a public cloud based on a publicly accessible network, and other types of systems including distributed virtual infrastructure. The embodiments described herein are not limited to any layout of infrastructure constituting a cloud environment.

In the context of the present disclosure, "service" in the cloud environment, also referred to as a "cloud service," indicates a function, processing, operation, capability, or the like, which is accessible via a cloud infrastructure. Non-limiting examples of services include a virtual computing environment, virtual operating system, virtual machine, network, server, data storage center, software product, application, or the like. Practical deployment or booting of the service in the cloud environment is referred to as "service instance."

Figure 1:
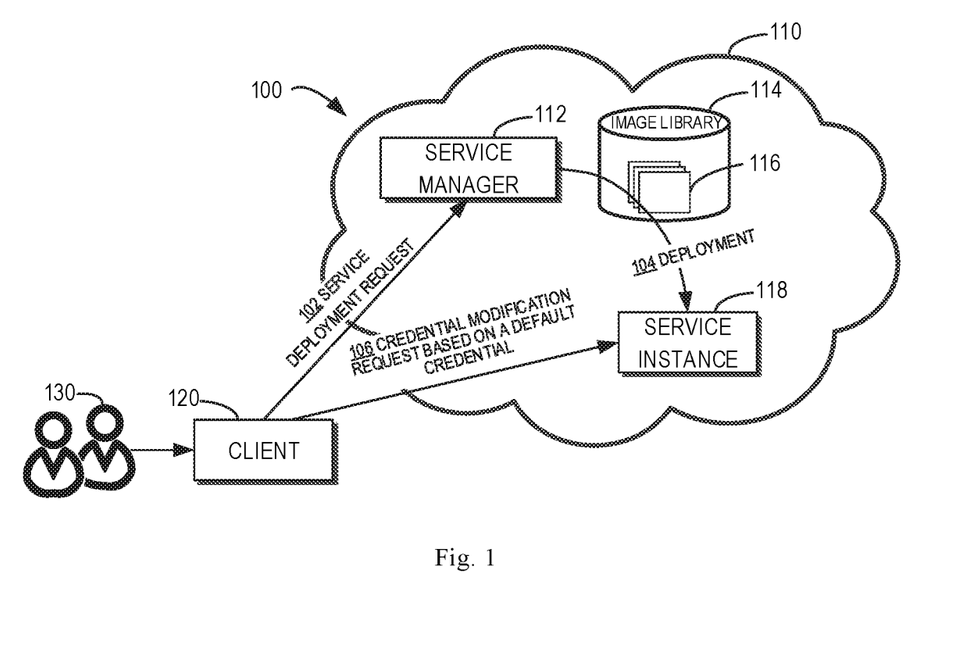
FIG. 1 illustrates a schematic block diagram of service deployment architecture in a conventional cloud environment.

FIG. 1 illustrates a schematic block diagram of service deployment architecture 100 in a conventional cloud environment. As shown in FIG. 1, a service manager 112 is included in the cloud environment 110, which is configured to manage a deployment, access, tailored configuration, or the like of one or more services in the cloud environment 110. An image library 114 is further included in the cloud environment 110, for storing an image file 116 of one or more services. The image file 116 of the service includes information required for booting up or deploying the instance of the service in the cloud environment 110.

In operation, a user 130 may access the cloud environment 110 via a client 120. For example, the user 130 may initiate, via the client 120, a service deployment request 102 for a certain service to the service manager 112. The user 130 may have purchased or obtained the service in another manner. The service manager 112 acknowledges that the user 130 or client 120 has a license to the requested service, obtains the corresponding image file 116 from the image library 114, and deploys 104 a service instance 118 corresponding to the requested service based on the image file 116.

A part of or all of functions of the service instance 118 are available after they are deployed. Before a user performs further security configuration, the service instance 118 is typically set with an initial default credential. The service instance 118 may be accessed via the default credential. The default credential may be, for example, set by a service provider and preconfigured in a corresponding image file. In some cases, after the service instance 118 is booted up, the user 130 may modify the credential for accessing the service instance 118, so as to implement user-specific settings and enable all functions of the service instance 118. For example, the user 130 may initiate, via the client 120, a credential modification request 106 for the service instance 118, to request to modify the credential of the service instance 118 as a certain credential configured by the user. The default credential is sent together with the credential modification request. At this time, the credential of the service instance 118 is modified to a credential configured by the user.

In the architecture as shown in FIG. 1, there is a time window after the service instance is deployed and before a particular credential by the user is configured, in which the service instance is accessible through the default credential. In some service deployment processes, the time window may reach 20 minutes or longer (depending on an operation of user). The default credential is convenient, to some extent, for a ready-to-use service. However, because the default credential is a predefined and probably widely known credential, there is a high risk that the service instance suffers from vicious attacks within the above time window; the credential is a fairly weak constituent of the service security. Because any security attack can access the deployed service instance via the network in the public cloud environment, the issue is particularly outstanding in a public cloud environment accessible to the public. There is no doubt that the time window for accessing a service instance based on a known default credential leaves chances to attackers.

In order to improve the service security, there is provided a solution for protecting service security according to the embodiments of the present disclosure. In the solution, other than using a default credential, an initial credential of a deployed service instance is set dynamically based on information specific to the service instance. Therefore, the initial credential is specific to the service instance and is generated in real time, thereby improving the security of the service instance. In addition, the initial credential is automatically provided to a client; enabling a user to obtain the current initial credential easily, thereby not sacrificing convenience of use for the service.

Figure 2:
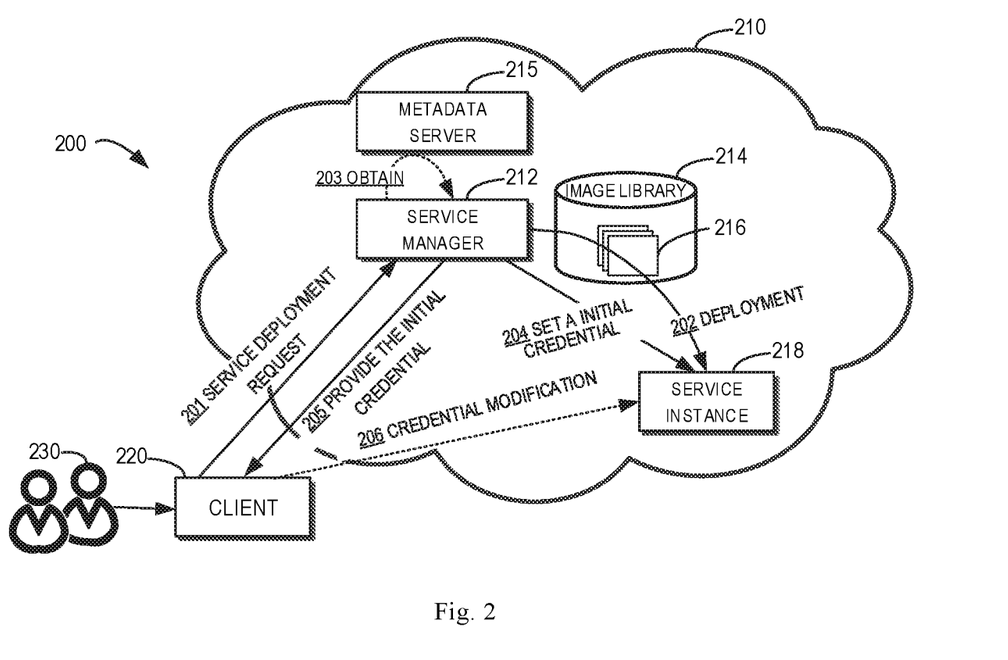
FIG. 2 illustrates a schematic block diagram of service deployment according to some embodiments of the present disclosure.

The embodiments of the present disclosure will be described below in detail with reference to FIG. 2. FIG. 2 illustrates a schematic block diagram of service deployment architecture 200 according to some embodiments of the present disclosure. As shown in FIG. 2, there is a service manager 212 in the cloud environment 210; the service manager 212 is configured to manage deployment, booting, access, tailored configuration, or the like, of one or more services in the cloud environment 110. The cloud environment 210 may include a public cloud based on a publicly accessible network. In some embodiments, the cloud environment 210 may include a private cloud based on a private or local network. The functionality of the service manager 212 may be implemented by a single physical or virtual computing device forming the cloud environment 210, or distributed into a plurality of physical or virtual computing devices, for example, implemented jointly by separate components on a plurality of computing devices. For example, the service manager 212 may include separate components, respectively for implementing deployment of a service instance (for example, which may be referred to as instance booting component) or access the service instance (for example, which may be referred to as instance operation management components).

The client 220 initiates 201 a deployment request for a certain service to the service manager 212 according to an operation of a user 230, for requesting to deploy the service into the cloud environment 210. The client 220 may initiate deployment of any type of service, so long as the service can be provided in the cloud environment 210. The instance of the service may include an application, such as an e-mail application, or data storage and management application; the instance of the service may further include a server, virtual computing environment, or the like. The user 230 may obtain the license of the service by purchasing or in another manner.

In response to receiving the deployment request from the client 220, the service manager 212 may determine whether the client 220 and/or the user 230 have the license to deploy the requested service. If it is determined that there is a license, the service manager 212 deploys a service instance corresponding to the requested service in the cloud environment 212. The service instance herein is a service booted for the current deployment request.

The service manager 212 may implement deployment of the service instance with any method suitable for deploying a service in a cloud environment. Deployment of the service instance is also referred to as booting of the service instance, to enable the corresponding service to be supplied to a user in the cloud environment. In a specific example, the service manager 212 obtains a corresponding image file 216 from an image library 214, and deploys 202 a service instance 218 corresponding to the requested service based on the image file 216. There is the image file 216 of one or more services stored in the image library 214. The image file 216 of the service includes information required for booting up or deploying the instance of the service in the cloud environment 210. The specific content of the image file, for example, may include a template of service deployment, license information, mapping of storage devices of the service instance, and the like. The image file may be provided by a service provider. Typically, a plurality of service instances may be deployed based on an image file corresponding to a single service, and these service instances may accomplish functions of respective services but may be operated independently of each other.

During or after deployment of the service instance 218, the service manger 212 sets a credential for the service instance 218. The credential of the service instance indicates one type of information for verifying whether access the service instance 218 is permitted, which may also be referred to as password, key, certificate, license, authorization, or the like. These terms can be used interchangeable herein. The credential set during deployment of the service instance is mainly for an initial access the service instance 218 after deployment, and thus also referred to as initial credential. It should be noted that the initial credential may only be allowed for use in an initial access the service instance 218, or may also be used for multiple accesses the service instance 218.

According to embodiments of the present disclosure, different than setting a predefined default credential as an initial credential, the service manager 212 sets 204 an initial credential based on information specific to the service instance 218. Based on the specific information as such, the service manager 212 may dynamically determine the initial credential of the service instance 218 during deployment. This kind of initial credential may only be obtained when the service instance is fully supplied, rather than preconfigured.

The information specific to the service instance 218 may be any information capable of identifying the service instance 218. In some embodiments, for different service instances corresponding to the same service and/or service instances corresponding to different services, the information specific to the service instance 218 may be different. In some embodiments, the information specific to the service instance 218 may include all or a part of metadata of the service instance 218. The metadata of the service instance 218, for example, may be generated, configured, managed, and the like, by a metadata server 215 in the cloud environment. The service manager 212 may obtain 203 all of the metadata or a part of the metadata to be used of the service instance 218 from the metadata server 215. It would be appreciated that, although shown as separate components, the service manager 212 and the metadata server 215 may also be integrated as a single component. In some embodiments, the service instance 218 may also obtain the metadata directly from the metadata server 215. In the embodiment, the service manager 212 may configure or modify which metadata item is to be used specifically as the initial credential.

The metadata includes information for describing one or more aspects of the service instance 218, and may be used to configure or manage the service instance being operated. The metadata is typically generated during deployment of the service instance and is associated with the service instance. The metadata may include one or more types of data items (or information), and the instance thereof includes, but is not limited to: an identifier (ID) of a service instance, which is allocated when deploying the service instance; a local host name of the service instance; an ID of a kernel booting up the service instance; one or more Internet Protocol (IP) addresses associated with the service instance, for example, an IP version 4 (IPv4) address or IPv6 address; a media access control (MAC) address of the service instance; an ID of a network interface; and a device number associated with a network interface of the service instance, and the like.

Only examples of some types of metadata are provided above, and embodiments of the present disclosure are not limited to the aforementioned examples. Moreover, it would be appreciated that, although the examples of metadata are listed, in embodiments of the present disclosure, any information specific to the service instance but not included in the metadata thereof may also be used to determine the initial credential of the service instance. For example, the service manager 212 may generate additional information randomly and dynamically, the additional information is specific to the deployed service instance 218.

When setting the initial credential, the service manager 212 may use the information specific to the service instance 218 directly as the initial credential. For example, the initial credential may be set as an ID or IP address of the service instance 218, or the like. In an alternative embodiment, the service manager 212 may generate further information as the initial credential based on information specific to the service instance 218. For example, the service manager 212 processes information specific to the service instance 218 with a predetermined algorithm. Further, information may be generated as the initial credential with any predetermined algorithm for information processing. For example, the predetermined algorithm may include performing hash processing for information specific to the service instance 218, or performing encryption with an encryption algorithm, to obtain the initial credential. The embodiments of the present disclosure are not limited in the aspect.

In some embodiments, the information specific to the service instance 28 may include multiple types of information, for example, multiple types of data items in the metadata. The service manager 212 may set the initial credential, with one or more types of information, or with all types of information. When a selection from multiple types of information is required, the service manager 212 may select predetermined type of information that is preconfigured or predefined. For example, the identifier of the service instance to be used may be predefined for setting the initial credential. In some embodiments, the predetermined type may be fixed, or the predetermined type to be used may be selected by the service manager 212 dynamically and randomly. The predetermined type may be varied periodically.

In some embodiments, the type of the information for determining the initial credential may be determined or changed by the user 230 via the client 220. For example, the client 220 may provide the service manager 212 with an indication of a selected type from a plurality of types. Upon receiving the indication, the service manager 212 may set the initial credential based on the type of information selected by the user 230. In addition to being triggered by the client 220, the type of the information for setting the initial credential may be changed by other events, for example, other service instances corresponding to the service having been attacked by hackers, or in response to a request from a service provider.

After determining the initial credential of the service instance 218 or after setting the initial credential is completed, the service manager 212 provides 205 the client 220 with related information of the set initial credential, such that the client 220 can derive the initial credential for accessing the service instance 218. In some embodiments, the service manager 212 may provide the initial credential directly to the client 220. In an alternative embodiment, the service manager 212 may provide information specific to the service instance 218 so as to enable the client 220 to determine the initial credential based on the information specific to the service instance. For example, if the service manager 212 generates the initial credential using a predetermined algorithm, the client 220 may generate the initial credential based on the same algorithm and the information specific to the service instance 218.

In some embodiments, in response to a query request from the client 220, the service manager 212 may provide the initial credential of the service instance 218 or the information (for example, metadata) specific to the service instance 218 to the client 220. For example, the client 220 may initiate a query through a management programming script, an application interface (API) or the like. If there is a plurality of types of information, and the service manager 212 dynamically changes the type of the information being used, the service manager 212 may also indicate, to the client 220, the type of the current information for generating the initial credential, such that the client 220 can determine the initial credential correspondingly.

Figure 3:
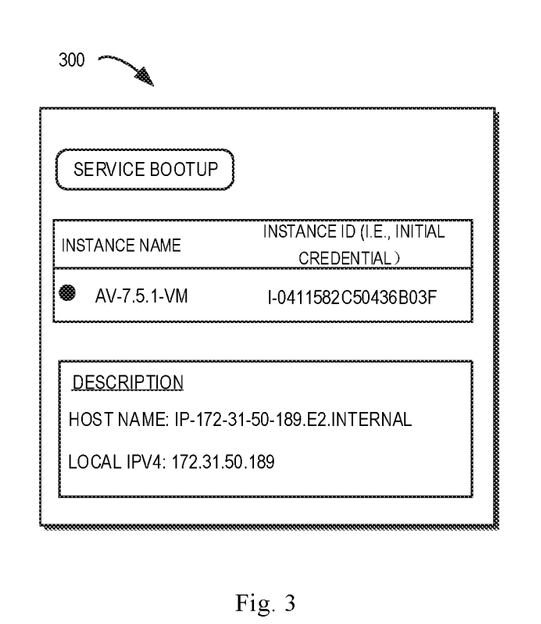
FIG. 3 illustrates a schematic block diagram of presenting an initial credential on a user interface of a client according to some embodiments of the present disclosure.

The initial credential or the information (for example, metadata) specific to the initial credential provided to the client 220 may be presented to the user 230 via the user interface of the client 220. FIG. 3 illustrates a schematic diagram of presenting the initial credential on a user interface 300 of a client according to some embodiments of the present disclosure. The user interface 300 shows thereon information of the service instance being deployed currently, and indicates that the instance ID is the initial credential.

After deployment of the service instance 218 is completed, the service instance 218 is accessible. The user 230 may access the service instance 218 via the client 220, using the initial credential. In some circumstances, the user 230 may request to modify the credential of the deployed service instance 218 voluntarily in the subsequent access, or may be requested to modify the credential of the service instance 218 in the initial access to fully enable the functions of the service instance 218.

The user 230 may initiate 206, via a client 220, a credential modification request for the service instance 218. The credential modification request includes an initial credential, and also includes a credential configured by a user. The credential modification request may be responded to by the service instance 218 per se, or other components (for example, the service manager 212) in the cloud environment 210.

If the credential modification request includes the initial credential, it can be determined that the client 220 or the user 230 has right to access the service instance 218. Correspondingly, the credential configured by a user may be set as a subsequent credential of the service instance 218. The client 220 may obtain an indication of modification acknowledgement from the service instance 218 or other components in the cloud environment 210, where the indication indicates that the credential configured by the user has been set as the credential of the service instance 218 successfully. In a subsequent operation, the service instance 218 may be accessed using the credential configured by a user. It would be appreciated that, although shown as a single request, the client 220 may be required to provide an initial credential first in a implementation, to verify the right to access the service instance 218. After the verification is passed, the client 220 then provides a credential for configuration of user.

According to the embodiments as described above, by generating an initial credential using information specific to an instance at a stage of deploying a service instance, security of the service can improved significantly without sacrificing convenience of use. In addition, along with deployment of the service instance, it is typically required to generate or allocate information specific to one or more aspects of the service instance, including metadata of the service instance, and generating the initial credential with the specific information will not cause a significant increase in the complexity of system.

Figure 4:
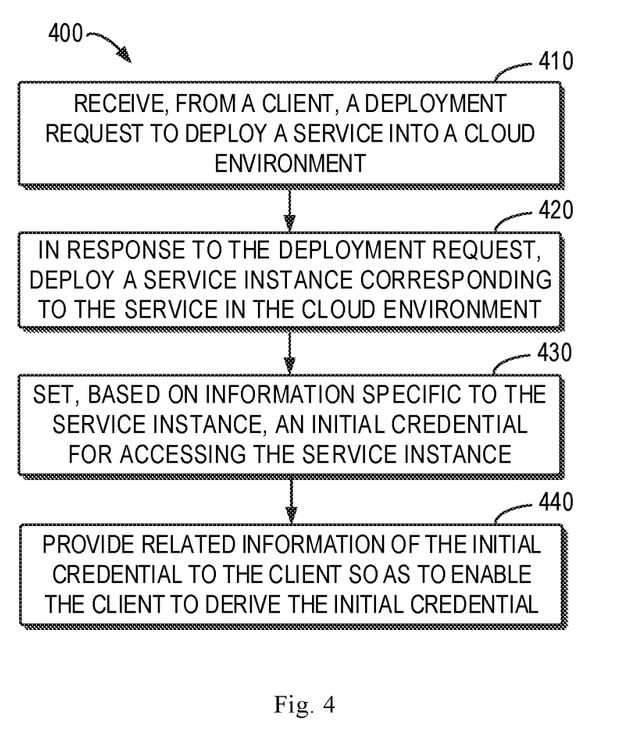
FIG. 4 illustrates a flowchart of a process of protecting service security implemented in a cloud environment according to some embodiments of the present disclosure.

FIG. 4 illustrates a flowchart of a process 400 of protecting service security according to some embodiments of the present disclosure. The process 400 may be implemented in the cloud environment 210 of FIG. 2, for example, implemented by the service manager 212 only or together with other components. For purpose of illustration, the process 400 will be described with reference to FIG. 2.

At block 410, the cloud environment 210 receives, from a client, a deployment request to deploy a service into the cloud environment. At block 420, in response to the deployment request, the cloud environment 210 deploys a service instance corresponding to the service in the cloud environment. At block 430, the cloud environment 210 sets, based on information specific to the service instance, an initial credential for accessing the service instance. At block 440, the cloud environment 210 provides related information of the initial credential to a client, so as to enable the client to derive the initial credential.

In some embodiments, the process 400 further includes: receiving, from a client, a credential modification request for a service instance, the credential modification request comprising a credential configured by a user and an initial credential; in response to determining that the credential modification request comprises the initial credential, setting the credential configured by the user as a subsequent credential for accessing the service instance; and providing a credential modification acknowledgement to the client, the credential modification acknowledgement indicating that the credential configured by a user is set as a subsequent credential for accessing the service instance.

In some embodiments, the information specific to the service instance comprises metadata related to the service instance.

In some embodiments, the information specific to the service instance comprises a plurality of types of information, and setting the initial credential comprises: obtaining, from the client, an indication of a selected type from the plurality of types; and setting the initial credential based on the selected type of information.

In some embodiments, the information specific to the service instance comprises a plurality of types of information, and setting the initial credential comprises: selecting a predetermined type of information of from the plurality of types of information; and setting the initial credential based on the selected type of information.

In some embodiments, providing the related information of the initial credential comprises one of the following: providing the initial credential directly; and providing the information specific to the service instance such that the initial credential is determined by the client based on the information specific to the service instance. In some embodiments, the cloud environment comprises a public cloud.

Figure 5:
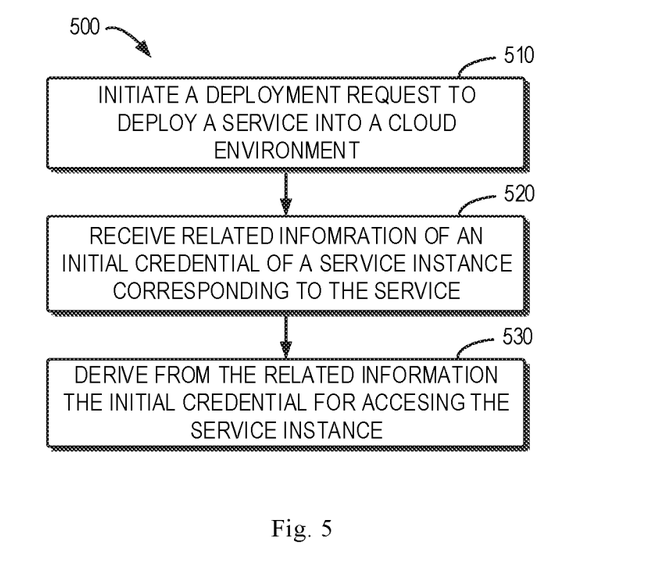
FIG. 5 illustrates a flowchart of a process of protecting service security implemented at a client according to some embodiments of the present disclosure.

FIG. 5 illustrates a flowchart of a process 500 of protecting service security according to some embodiments of the present disclosure. The process 500 may be implemented by the client 220 in FIG. 2. For purpose of illustration, the process 500 will be described with reference to FIG. 2.

At block 510, the client 220 initiates a deployment request to deploy a service to a cloud environment. At block 520, the client 220 receives related information of an initial credential of a service instance corresponding to the service. The service instance has been deployed in the cloud environment, and the initial credential is set based on information specific to the service instance. At block 530, the client 220 derives from the related information the initial credential for accessing the service instance.

In some embodiments, the process 500 further comprises: initiating a credential modification request for the service instance, the credential modification request comprising a credential configured by a user and an initial credential; and receiving a credential modification acknowledgement, the credential modification acknowledgement indicating that the credential configured by the user is set as a subsequent credential for accessing the service instance.

In some embodiments, the information specific to the service instance comprises a plurality of types of information, and the process 500 further comprises: providing an indication of a selected type from the plurality of types for setting the initial credential based on the selected type of information.

In some embodiments, receiving the related information of the initial credential comprises receiving information specific to the service and deriving the initial credential comprises generating the initial credential based on the information specific to the service instance. In some embodiments, receiving the related information of the initial credential comprises receiving the initial credential directly.

In some embodiments, the information specific to the service instance comprises metadata associated with the service instance. In some embodiments, the cloud environment comprises a public cloud.

Figure 6:
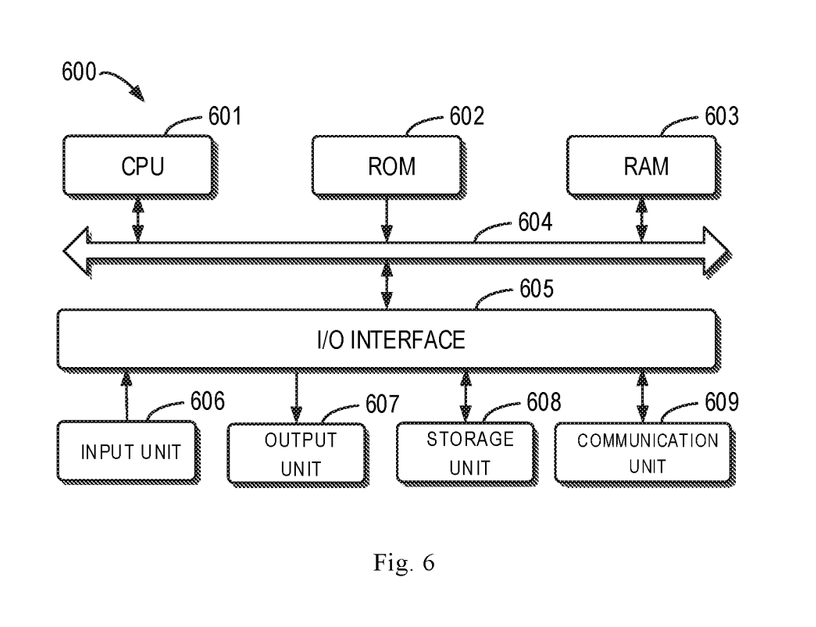
FIG. 6 illustrates a block diagram of an example device that can be used to implement embodiments of the present disclosure.

FIG. 6 illustrates a schematic block diagram of an example device 600 that can be used to implement the embodiments of the present disclosure. The device 600 may be implemented as a device in the cloud environment 210 of FIG. 2 (to support operations of the cloud environment 210) or may be implemented as a client 220. Alternatively, the device 600 may be included in the cloud environment 210 or client 220.

As shown, the device 600 includes a central processing unit (CPU) 601, which may perform various suitable acts and processing based on computer program instructions stored in a read-only memory (ROM) 602 or computer program instructions loaded from a storage unit 608 to a random-access memory (RAM) 603. The RAM 603 may also store various kinds of programs and data required by the operations of the device 600. The CPU 601, ROM 602 and RAM 603 are connected to each other via a bus 604. An input/output (I/O) interface 605 is also connected to the bus 604.

A plurality of components in the device 600 is connected to the I/O interface 605, including: an input unit 606, such as a keyboard, a mouse and the like; an output unit 607, e.g., various kinds of displays and loudspeakers etc.; a storage unit 608, such as a disk and an optical disk etc.; and a communication unit 609, such as a network card, a modem, a wireless transceiver and the like. The communication unit 609 allows the device 600 to exchange information/data with other devices via the computer network, such as Internet, and/or various telecommunication networks.

Each of the methods and processes described above, such as the process 400 and/or the process 500, may also be performed by the processing unit 601. For example, in some embodiments, the process 400 and/or process 500 may be implemented as a computer software program or a computer program product being tangibly included on a machine-readable medium, such as a non-transient computer readable medium, e.g., the storage unit 608. In some embodiments, part of or the entire of the computer program may be loaded and/or mounted to the device 600 via the ROM 602 and/or communication unit 609. When the computer program is loaded to the RAM 603 and performed by the CPU 601, one or more steps of the above described process 300 and/or process 400 may be performed. Alternatively, in other embodiments, the CPU 601 may be configured via any other suitable manners (e.g., by means of firmware) to perform the process 400 and/or process 500.

Those skilled in the art would understand that various steps of the methods of the disclosure may be implemented by a general purpose computing device, which may be integrated on a single computing device or distributed over a network composed of a plurality of computing devices. Alternatively, they may be implemented using program code executable by the computing device, such that they may be stored in a storage device and executed by the computing device; or they may be made into respective integrated circuit modules or a plurality of modules or steps therein may be made into a single integrated circuit module for implementation. The present disclosure is not limited to any specific combination of hardware and software in this regard.

It would be appreciated that although several apparatuses or sub-apparatuses of the device have been mentioned in detailed description above, such partition is only an example, without limitation. Actually, according to the embodiments of the present disclosure, features and functions of two or more apparatuses described above may be instantiated in one apparatus. In turn, features and functions of one apparatus described above may be further partitioned to be instantiated by various apparatuses.

What have been mentioned above are only some alternative embodiments of the present disclosure and are not limiting the present disclosure. For those skilled in the art, there may be various alternations and changes in the present disclosure. Any modifications, equivalents and improvements made within the spirits and principles of the present disclosure should be included within the scope of the present disclosure.

We claim:

1. A method of protecting service security, comprising:
receiving, from a client, a deployment request to deploy a service into a cloud environment;
in response to the deployment request, deploying a service instance corresponding to the service in the cloud environment;
generating, based on metadata that is specific to the service instance, an initial credential for accessing the service instance; and
providing related information associated with the initial credential to the client, the initial credential being derivable from the related information.

2. The method of claim 1, further comprising:
receiving, from the client, a credential modification request for the service instance, the credential modification request comprising a credential configured by a user and the initial credential;
in response to determining that the credential modification request comprises the initial credential, setting the credential configured by the user as a subsequent credential for accessing the service instance; and
providing a credential modification acknowledgement to the client, the credential modification acknowledgement indicating that the credential configured by the user is set as the subsequent credential for accessing the service instance.

3. The method of claim 1, wherein the metadata that is specific to the service instance comprises a plurality of types of information, and generating the initial credential comprises:
obtaining, from the client, an indication of a selected type from the plurality of types; and
generating the initial credential based on the selected type of information.

4. The method of claim 1, wherein the metadata that is specific to the service instance comprises a plurality of types of information, and generating the initial credential comprises:
selecting a predetermined type of information from a plurality of types of information; and
generating the initial credential based on the selected type of information.

5. The method of claim 1, wherein providing the related information associated with the initial credential comprises one of the following:
providing the initial credential to the client; and
providing the metadata, specific to the service instance, from which the initial credential is derivable.

6. The method of claim 1, wherein the cloud environment comprises a public cloud.

7. The method of claim 1, further comprising generating the initial credential based on metadata that is generated during deployment of the service instance.

8. The method of claim 1, further comprising:
generating, based on the initial credential, the related information from which the initial credential is derivable; and
sending the related information to the client.

9. A method of protecting service security, comprising:
initiating a deployment request to deploy a service into a cloud environment;
in response to initiating the deployment request, receiving related information that is associated with an initial credential of a service instance corresponding to the service, the service instance having been deployed in the cloud environment, and the initial credential being generated based on metadata that is specific to the service instance; and
based on the related information, deriving the initial credential for accessing the service instance.

10. The method of claim 9, further comprising:
initiating a credential modification request for the service instance, the credential modification request comprising a credential configured by a user and the initial credential; and
receiving a credential modification acknowledgement, the credential modification acknowledgement indicating that the credential configured by the user is set as a subsequent credential for accessing the service instance.

11. The method of claim 9, wherein the metadata that is specific to the service instance comprises a plurality of types of information, and the method further comprises:
providing an indication of a selected type from the plurality of types for generating the initial credential based on the selected type of information.

12. The method of claim 9, wherein receiving the related information of the initial credential comprises receiving the metadata that is specific to the service instance, and
wherein deriving the initial credential comprises generating the initial credential based on the metadata that is specific to the service instance.

13. The method of claim 9, wherein receiving the related information associated with the initial credential comprises receiving the initial credential.

14. An electronic device, comprising:
a processor; and
a memory coupled to the processor and having instructions stored therein, the instructions, when executed by the processor, causing the device to perform a method, the method comprising:
receiving, from a client, a deployment request to deploy a service into a cloud environment;
in response to the deployment request, deploying a service instance corresponding to the service in the cloud environment;
generating, based on metadata that is specific to the service instance, an initial credential for accessing the service instance; and
providing related information associated with the initial credential to the client, the initial credential being derivable from the related information.

15. The device of claim 14, wherein the method further comprises:
    receiving, from the client, a credential modification request for the service instance, the credential modification request comprising a credential configured by a user and the initial credential;
    in response to determining that the credential modification request comprises the initial credential, setting the credential configured by the user as a subsequent credential for accessing the service instance; and
    providing a credential modification acknowledgement to the client, the credential modification acknowledgement indicating that the credential configured by the user is set as the subsequent credential for accessing the service instance.

16. The device of claim 14, wherein the metadata that is specific to the service instance comprises a plurality of types of information, and generating the initial credential comprises:
    obtaining, from the client, an indication of a selected type from the plurality of types; and
    generating the initial credential based on the selected type of information.

17. The device of claim 14, wherein the metadata that is specific to the service instance comprises a plurality of types of information, and generating the initial credential comprises:
    selecting a predetermined type of information from a plurality of types of information; and
    generating the initial credential based on the selected type of information.

18. The device of claim 14, wherein providing the related information associated with the initial credential comprises one of the following:
    providing the initial credential to the client; and
    providing the metadata, specific to the service instance, from which the initial credential is derivable.

19. The device of claim 14, wherein the cloud environment comprises a public cloud.

* * * * *